United States Patent
Takeda et al.

(10) Patent No.: US 10,778,485 B2
(45) Date of Patent: Sep. 15, 2020

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 13 days.

(21) Appl. No.: 16/300,392

(22) PCT Filed: May 11, 2017

(86) PCT No.: PCT/JP2017/017777
§ 371 (c)(1),
(2) Date: Nov. 9, 2018

(87) PCT Pub. No.: WO2017/195850
PCT Pub. Date: Nov. 16, 2017

(65) Prior Publication Data
US 2019/0140878 A1  May 9, 2019

(30) Foreign Application Priority Data

May 12, 2016  (JP) .................. 2016-096439

(51) Int. Cl.
*H04L 27/26* (2006.01)
*H04W 28/06* (2009.01)
(Continued)

(52) U.S. Cl.
CPC ........ *H04L 27/2607* (2013.01); *H04L 1/0026* (2013.01); *H04L 1/1819* (2013.01);
(Continued)

(58) Field of Classification Search
None
See application file for complete search history.

(56) References Cited

U.S. PATENT DOCUMENTS

2015/0351092 A1* 12/2015 Seo .................. H04W 4/70
370/329
2016/0337157 A1* 11/2016 Papasakellariou ..... H04B 3/232
(Continued)

OTHER PUBLICATIONS

LG Electronics; "Discussion on PUCCH design for HARQ-ACK in shortened TTI"; 3GPP TSG RAN WG1 Meeting #84bis R1-162507; Busan, Korea, Apr. 11-15, 2016 (7 pages).
(Continued)

*Primary Examiner* — Chi H Pham
*Assistant Examiner* — Vladislav Y Agureyev
(74) *Attorney, Agent, or Firm* — Osha Liang LLP

(57) ABSTRACT

The present invention is designed to suitably support transmission of uplink control information even when shortened TTIs are used. According to one aspect of the present invention, a user terminal that communicates using a shortened transmission time interval (TTI), in which the TTI duration is shorter than one ms, has a control section that controls transmission of uplink control information, and a transmission section that transmits the uplink control information in a predetermined shortened TTI, using an uplink control channel format, which is for shortened TTIs and which is compatible with multiple TTI durations.

9 Claims, 20 Drawing Sheets

(51) Int. Cl.
*H04W 72/04* (2009.01)
*H04L 1/00* (2006.01)
*H04L 1/18* (2006.01)
*H04L 5/00* (2006.01)
*H04W 80/08* (2009.01)

(52) U.S. Cl.
CPC .......... *H04L 5/0048* (2013.01); *H04W 28/06* (2013.01); *H04W 72/04* (2013.01); *H04W 72/0413* (2013.01); *H04L 5/001* (2013.01); *H04W 80/08* (2013.01)

(56) References Cited

U.S. PATENT DOCUMENTS

| | | | | |
|---|---|---|---|---|
| 2016/0360518 | A1* | 12/2016 | Noh | H04L 27/2607 |
| 2017/0134236 | A1 | 5/2017 | Patel | H04W 74/004 |
| 2017/0164352 | A1* | 6/2017 | Yang | H04L 5/0053 |
| 2017/0215202 | A1* | 7/2017 | Yang | H04L 5/0055 |
| 2017/0223695 | A1* | 8/2017 | Kwak | H04W 56/0075 |
| 2017/0238312 | A1* | 8/2017 | Chen | H04L 5/0048 370/329 |
| 2017/0290008 | A1* | 10/2017 | Tooher | H04L 1/0007 |
| 2017/0310431 | A1* | 10/2017 | Iyer | H04L 1/1816 |
| 2017/0317808 | A1* | 11/2017 | You | H04L 5/0055 |
| 2017/0325216 | A1* | 11/2017 | Nogami | H04L 1/1812 |
| 2017/0366311 | A1* | 12/2017 | Iyer | H04B 7/0482 |
| 2017/0366380 | A1* | 12/2017 | Hwang | H04W 72/0413 |
| 2017/0374658 | A1* | 12/2017 | Kim | H04L 1/1896 |
| 2018/0013533 | A1 | 1/2018 | Yang | H04L 5/001 |
| 2018/0083751 | A1* | 3/2018 | Seo | H04L 5/0037 |
| 2018/0098337 | A1* | 4/2018 | Lee | H04W 72/1273 |
| 2018/0176909 | A1* | 6/2018 | Wikstrom | H04W 72/0446 |
| 2018/0206224 | A1* | 7/2018 | Hwang | H04L 27/26 |
| 2018/0376495 | A1* | 12/2018 | Lee | H04W 72/04 |
| 2019/0007175 | A1* | 1/2019 | Kwak | H04L 1/1861 |
| 2019/0007182 | A1* | 1/2019 | Li | H04L 1/0025 |
| 2019/0068423 | A1* | 2/2019 | Hwang | H04L 5/0053 |
| 2019/0081839 | A1* | 3/2019 | Qu | H04L 27/2607 |
| 2019/0132865 | A1* | 5/2019 | Zhou | H04L 5/0051 |
| 2019/0190663 | A1* | 6/2019 | Sahlin | H04L 1/1887 |
| 2020/0092876 | A1* | 3/2020 | Cho | H04W 72/0413 |

OTHER PUBLICATIONS

Ericsson; "Physical layer aspects for PUCCH for short TTI"; 3GPP TSG RAN WG1 Meeting #84 bis R1-163321; Busan, Korea, Apr. 11-15, 2016 (3 pages).
NTT Docomo, Inc.; "WF on another new PUCCH format including CDM"; 3GPP TSG RAN WG1 #82bis R1-156125; Malmo, Sweden, Oct. 5-9, 2015 (6 pages).
ZTE; "Remaining issues on new PUCCH formats design"; 3GPP TSG RAN WG1 Meeting #83 R1-156654; Anaheim, USA, Nov. 15-22, 2015 (7 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 12)"; Dec. 2014 (251 pages).
Written Opinion issued for PCT/JP20171017777, dated Aug. 1, 2017 (9 pages).
International Search Report issued for PCT/JP20171017777, dated Aug. 1, 2017 (5 pages).
Extended European Search Report issued in the counterpart European Patent Application No. 17796208.1, dated Nov. 15, 2019 (9 pages).
Qualcomm, et al.; "Description of PUSCH-like PUCCH format with CDM"; 3GPP TSG RAN WG1 #82bis, R1-156308; Malmo, Sweden, Oct. 5-9, 2015 (6 pages).
CATT; "Design of sPUCCH for shortened TTI"; 3GPP TSG RAN WG1 Meeting #84bis, R1-162298; Busan, Korea, Apr. 11-15, 2016 (3 pages).

* cited by examiner

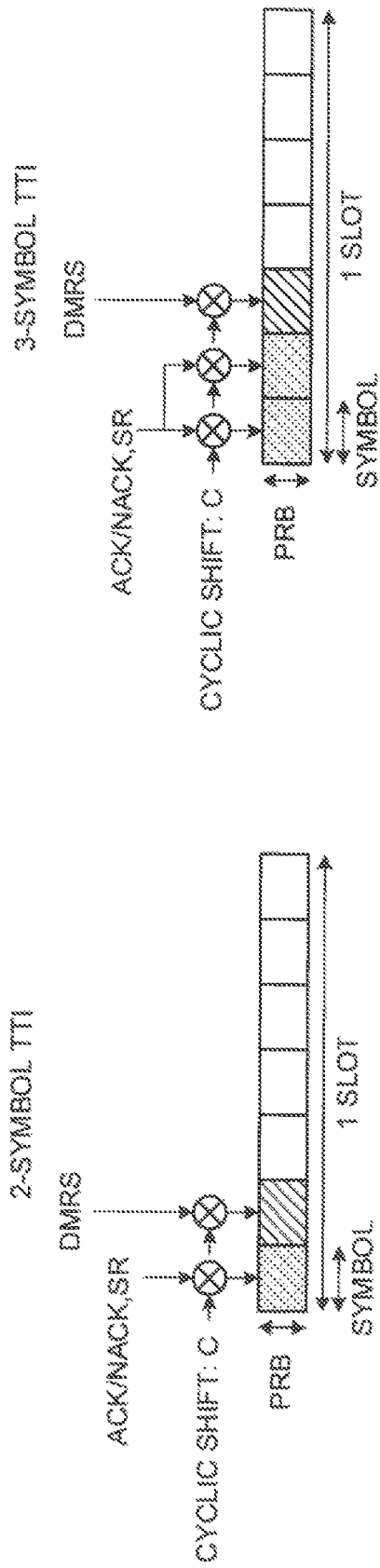
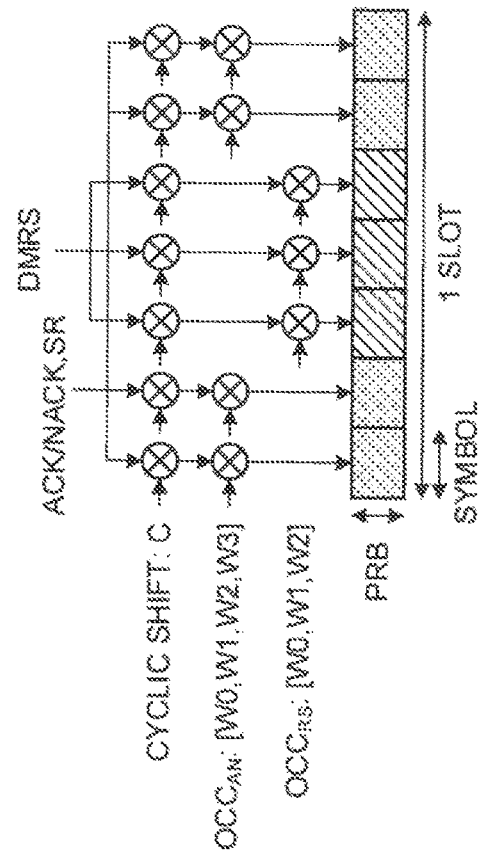
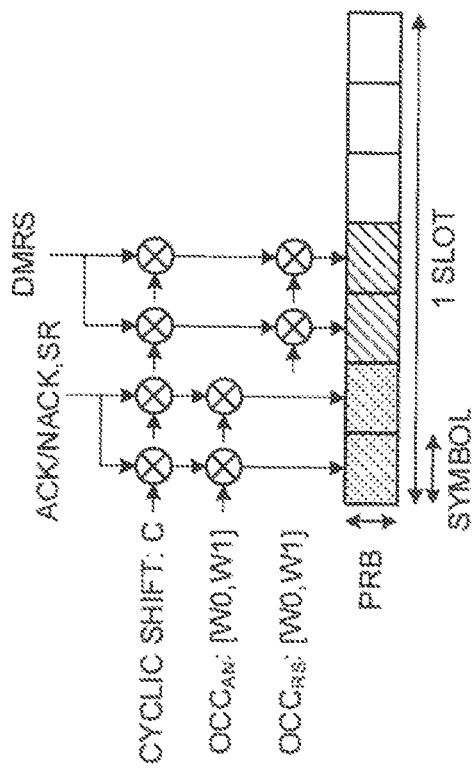
FIG. 1A
FIG. 1B
FIG. 1C
FIG. 1D

NUMBER OF PRBs FOR PF4

| VALUE OF NUMBER OF PRB-FORMAT4-R13 | $M^{PUCCH4}_{RB}$ |
|---|---|
| 0 | 1 |
| 1 | 2 |
| 2 | 3 |
| 3 | 4 |
| 4 | 5 |
| 5 | 6 |
| 6 | 8 |
| 7 | RESERVED |

FIG. 4

| sPUCCH PAYLOAD | sPUCCH BASE FORMAT | 2-SYMBOL sTTI | 3-SYMBOL sTTI | 4-SYMBOL sTTI W/ INTRA-TTI HOPPING | 7-SYMBOL sTTI W/ INTRA-TTI HOPPING |
|---|---|---|---|---|---|
| 1 PRB | PF1/1a/1b | 1 / 2 bit(s) | 1 / 2 bit(s) | 1 / 2 bit(s) | 1 / 2 bit(s) |
| | PF5 | ~~12 bits~~ | 24 bits | 24 bits | 60 bits |
| | PF4 | 24 bits | 48 bits | 48 bits | 120 bits |
| 2 PRBs | PF4 | 48 bits | 96 bits | 96 bits | 240 bits |
| ... | PF4 | ... | ... | ... | ... |
| N PRBs | PF4 | N * 24 bits | N * 48 bits | N * 48 bits | N * 120 bits |

FIG. 7

| sPUCCH PAYLOAD | 2-SYMBOL sTTI | 3-SYMBOL sTTI | 4-SYMBOL sTTI W/ INTRA-TTI HOPPING | 7-SYMBOL sTTI W/ INTRA-TTI HOPPING |
|---|---|---|---|---|
| CDM=12 (CYCLIC SHIFT IN FREQ.) 1 PRB | 1/2 bit(s) | 4 bits | 4 bits | 10 bits |
| 2 PRBs | 4 bits | 8 bits | 8 bits | 20 bits |
| ... | ... | ... | ... | ... |
| N PRBs | N * 2 bits | N * 4 bits | N * 4 bits | N * 10 bits |

FIG. 12A

| sPUCCH PAYLOAD | 2-SYMBOL sTTI | 3-SYMBOL sTTI | 4-SYMBOL sTTI W/ INTRA-TTI HOPPING | 7-SYMBOL sTTI W/ INTRA-TTI HOPPING |
|---|---|---|---|---|
| CDM=4 (OCC IN FREQ.) 1 PRB | 6 bits | 12 bits | 12 bits | 30 bits |
| 2 PRBs | 12 bits | 24 bits | 24 bits | 80 bits |
| ... | ... | ... | ... | ... |
| N PRBs | N * 6 bits | N * 12 bits | N * 12 bits | N * 30 bits |

FIG. 12B

| sPUCCH PAYLOAD | | 2-SYMBOL sTTI | 3-SYMBOL sTTI | 4-SYMBOL sTTI W/ INTRA-TTI HOPPING | 7-SYMBOL sTTI W/ INTRA-TTI HOPPING |
|---|---|---|---|---|---|
| CDM=3 (OCC IN FREQ.) | 1 PRB | 8 bits | 16 bits | 16 bits | 40 bits |
| | 2 PRBs | 16 bits | 32 bits | 32 bits | 80 bits |
| | ... | ... | ... | ... | ... |
| | N PRBs | N * 8 bits | N * 16 bits | N * 16 bits | N * 40 bits |

FIG. 13A

| sPUCCH PAYLOAD | | 2-SYMBOL sTTI | 3-SYMBOL sTTI | 4-SYMBOL sTTI W/ INTRA-TTI HOPPING | 7-SYMBOL sTTI W/ INTRA-TTI HOPPING |
|---|---|---|---|---|---|
| CDM=2 (OCC IN FREQ.) | 1 PRB | 12 bits | 24 bits | 24 bits | 60 bits |
| | 2 PRBs | 24 bits | 48 bits | 48 bits | 120 bits |
| | ... | ... | ... | ... | ... |
| | N PRBs | N * 12 bits | N * 24 bits | N * 24 bits | N * 60 bits |

FIG. 13B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" and/or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed by different radio base stations are configured in a UE, is also introduced. Each cell group is comprised of at least one cell (CC). In DC, since multiple CCs of different radio base stations are integrated, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which DL transmission and UL transmission are switched over time and made in the same frequency band, are introduced.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.).

For example, 5G is under research to provide radio communication services referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)," and so on. Note that, depending on the communicating device, M2M may be referred to as "D2D (Device To Device)," "V2V (Vehicle To Vehicle)," and/or the like. To fulfill the requirements for the above-mentioned various kinds of communication, studies are going on to design a new communication access scheme (new RAT (Radio Access Technology)).

For 5G, a study in underway to provide a technique of latency reduction to shorten the length of transmission time intervals (TTIs). By using this technology, it is expected that, the processing time of physical layer control signals is reduced from 0.5 ms (milliseconds) to approximately a duration of one OFDM (Orthogonal Frequency Division Multiplexing) symbol.

In addition, a PUCCH to be transmitted in shorter TTIs than an existing uplink control channel (PUCCH (Physical Uplink Control CHannel)) (also referred to as "shortened PUCCH (sPUCCH)," etc.) is under study. However, the specific configuration/format of sPUCCH has not been studied yet. Without specifying and supporting an appropriate sPUCCH configuration, problems such as deterioration in communication quality, communication throughput, spectral efficiency and others might surface.

The present invention has been made in view of the above, and it is therefore an object of the present invention to provide a user terminal and a radio communication method that can suitably support transmission of uplink control information even when shortened TTIs are used.

Solution to Problem

According to one aspect of the present invention, a user terminal communicates using a shortened transmission time interval (TTI) in which the TTI duration is shorter than one ms, and this user terminal has a control section that controls transmission of uplink control information, and a transmission section that transmits the uplink control information in a given shortened TTI, using an uplink control channel format for shortened TTI that is compatible with multiple TTI durations.

Advantageous Effects of Invention

According to the present invention, it is possible to suitably support transmission of uplink control information even when shortened TTIs are used.

BRIEF DESCRIPTION OF DRAWINGS

FIGS. 1A to 1D are diagrams, each showing an example of how a first sPF is structured;

FIG. 4 is a diagram to show a table related to the number of PRBs used in existing PF 4;

FIG. 7 is a diagram to show examples of sPF payload sizes that allow transmission according to the first embodiment;

FIGS. 12A and 12B are diagrams to show examples of sPF payload sizes that allow transmission according to the second embodiment;

FIGS. 13A and 13B are diagrams to show other examples of sPF payload sizes that allow transmission according to the second embodiment;

DESCRIPTION OF EMBODIMENTS

Figure 2B:
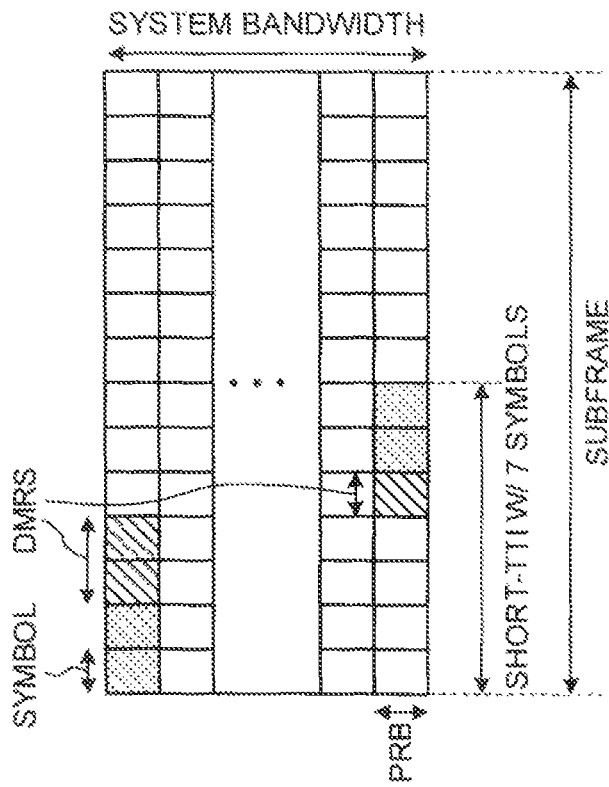
FIGS. 2A and 2B are diagrams, each showing another example of how the first sPF is structured.

In existing systems (for example, LTE Rel. 8 to 12), uplink control information (UCI) is fed back from a UE to a device on the network side (for example, referred to as a "base station (eNB (eNodeB))," "BS (Base Station)" and so on). At a timing where uplink data transmission is scheduled, the UE may transmit UCI using an uplink shared channel (PUSCH (Physical Uplink Shared CHannel)). The base station performs data retransmission control, scheduling control and so on for the UE based on the received UCI.

UCI in existing systems includes channel state information (CSI), which includes at least one of a channel quality indicator (CQI), a precoding matrix indicator (PMI), a precoding type indicator (PTI), and a rank indicator (RI), and includes delivery acknowledgment information for downlink signals (for example, downlink shared channel (PDSCH (Physical Downlink Shared CHannel)), a scheduling request (SR) and so on. The delivery acknowledgment information may be referred to as "HARQ-ACK (Hybrid Automatic Repeat reQuest Acknowledgment)," "ACK/ NACK (A/N)," "retransmission control information," and so on.

For example, in existing systems, periodic CSI (P-CSI) reporting, in which the UE transmits CSI in subframes of a predetermined period, is supported. To be more specific, in the UE, P-CSI transmission subframe information is received (configured) from the eNB via higher layer signaling (for example, RRC (Radio Resource Control) signaling). Here, the transmission subframe information refers to information that indicates the subframe to transmit P-CSI (hereinafter also referred to as a "reporting subframe"), and includes at least the cycle (interval) of this reporting subframe and the offset value of this reporting subframe with respect to the beginning of the radio frame. The UE transmits P-CSI in transmission subframes of the predetermined cycle indicated by the transmission subframe information.

Feedback (UCI on PUCCH) using an uplink control channel (PUCCH (Physical Uplink Control CHannel)) and feedback (UCI on PUSCH) using an uplink shared channel (PUSCH (Physical Uplink Shared CHannel)) are defined as UCI feedback methods. For example, if there is uplink user data, the UE transmits UCI using the PUSCH. On the other hand, if there is no uplink user data, the UE transmits UCI using the PUCCH.

Note that UCI on PUSCH is produced when UCI transmission and PUSCH transmission overlap in one TTI (for example, one subframe). In this case, the UCI may be mapped to the PUCCH resource and simultaneous PUCCH-PUSCH transmission may be performed, or the UCI may be mapped to radio resources in the PUSCH field and the PUSCH alone may be transmitted.

By the way, in order to provide a technique of latency reduction in 5G, study is in progress to shorten the TTI duration. Here, a TTI having a time duration of 1 ms as well as an existing subframe may be referred to as a "normal TTI" (for example, in LTE Rel. 8 to 12). A TTI that is shorter than a normal may be referred to as a "shortened TTI (sTTI)."

An sPUCCH to be transmitted in a shorter time period than the existing PUCCH is under research for use in sTTIs. However, the specific configuration/format of the sPUCCH has not been studied yet. Unless an appropriate sPUCCH configuration is specified, the capacity (for example, the number of UEs to be multiplexed) of the communication system, the block error rate (BLER) of the sPUCCH and so on will decrease.

So, the present inventors have focused on the fact that existing PUCCH formats (PFs) are designed on the premise that one TTI is one subframe (=fourteen symbols) on a fixed basis, and come up with the idea of providing an sPUCCH format (sPF (shortened PUCCH Format)), in which the number of symbols is variable depending on the TTI duration.

According to one aspect of the present invention, even when sTTIs are used, it is possible to provide a trade-off between the quality of communication and overhead, and/or others, suitably, for both UCI of large size and UCI of small size.

Now, embodiments of the present invention will be described in detail below with reference to the accompanying drawings. Note that the radio communication methods according to the herein-contained embodiments may be used individually or may be used in combination.

Radio Communication Method

First Embodiment

In the first embodiment of the present invention, multiple (for example, two) sPFs that are compatible with different TTI durations are set forth and used. These sPFs are preferably structured based on existing PFs.

For example, an sPF for relatively small payload sizes (for example, one bit, two bits, etc.), based on PP 1/1a/1b (hereinafter also referred to as "first sPF"), may be set forth and used. Also, an sPF for relatively large payload sizes, based on PF 4 or 5 (hereinafter also referred to as "second sPF"), may be set forth and used.

First sPF

A first sPF preferably supports (covers) TTI durations of two, three, four and/or seven symbols. Note that at least two symbols are preferably arranged in the same frequency, and intra-TTI frequency hopping needs not be applied to the first sPF comprised of a TTI duration of two or three symbols. Meanwhile, intra-TTI frequency hopping may or may not be applied to the first sPF comprised of a TTI duration of four or seven symbols.

Note that the length of symbols may be represented in, for example, units of OFDM/SC-FDMA (Single Carrier Frequency Division Multiple Access) symbols, in reciprocal units of a predetermined bandwidth (that is, the sampling length), or in other units. The same applies to the following embodiments.

In the first sPF, both the demodulation reference signal (DMRS (DeModulation Reference Signal)) and data are mapped to the same frequency for channel estimation (coherent detection). Also, since the first sPF does not need to support a large number of bits, the number of physical resource blocks (PRB (Physical RBs)) to use to transmit each symbol is one.

Depending on the number of symbols in a TTI, the number of UEs that are code-division-multiplexed (CDM (Code Division Multiplexing)) is changed (that is, the spreading factor is changed). For example, it is preferable to configure the first sPF, comprised of a TTI duration of two or three symbols, so as to adopt CDM that is based on cyclic shift, and to support maximum twelve UEs. Meanwhile, it is preferable to configure the first sPF, comprised of a TTI duration of four or seven symbols, so as to adopt CDM that is based on cyclic shift and orthogonal spreading code (OCC (Orthogonal Cover Code)).

To be more specific, the first sPF that includes two DMRSs and that is comprised of a TTI duration of four symbols is preferably configured to support twenty-four UEs. Also, the first sPF that includes two DMRSs and that is comprised of a TTI duration of seven symbols, to which intra-TTI frequency hopping is applied, is preferably configured to support twenty-four UEs. Furthermore, the first sPF that includes two DMRSs and that is comprised of a TTI duration of seven symbols, to which intra-TTI frequency hopping is not applied, is preferably configured to support thirty-six UEs.

As for the coding method of the first sPF, block spreading code may be used. Also, transmit antenna diversity may be configured for the first sPF. Here, transmit antenna diversity may be spatial orthogonal-resource transmit diversity (SORTD), which uses varying PRBs and/or orthogonal code sequences (cyclic shifts, block spreading sequences, etc.) between antennas.

FIG. 1 provide diagrams, each showing an example of how the first sPF is structured. FIG. 1 show how symbols are mapped in the time direction. FIGS. 1A to 1D show the cyclic shifts and/or OCCs that are applied to data symbols where UCI (A/N, SR, etc.) is mapped, and to reference signal symbols where DMRSs are mapped. With the first sPF, cyclic shift C may be selected from the same set, regardless of the number of symbols, or may be selected from different sets, depending on the number of symbols. Furthermore, cyclic shift C may be different between data symbols and reference signal symbols, or may be the same.

When the number of symbols is four or more, OCC is applied. Referring to FIG. 1, data symbols and reference signal symbols are multiplied by $OCC_{AN}$ and $OCC_{RS}$ of code length 2. The code sequence of $OCC_{AN}$ ([W0, W1]) and the code sequence of $C_{RS}$ ([W0, W1]) may be different, or may be the same.

In FIG. 1D, data symbols are multiplied by $OCC_{AN}$ of code length 4, and reference signal symbols are multiplied by $OCC_{RS}$ of code length 3. The code sequence of $OCC_{AN}$ ([W0, W1, W2, W3]) and the code sequence of $C_{RS}$ ([W0, W1, W2]) may be different, or may be the same.

Note that FIG. 1 show examples in which the first sPF is mapped to consecutive symbols from the beginning in one slot, the time resources for mapping the first sPF are not limited to these. In addition, although FIG. 1 show examples in which the first symbol is a data symbol, the first symbol may be a reference signal symbol, and the order in which data symbols and reference signal symbols are arranged is not limited to the examples in these drawings. Likewise, the following drawings do not limit the configuration of mapping either.

FIG. 2 are diagrams, each showing another example of how the first sPF is structured. FIG. 2 show how symbols are mapped in the time and frequency directions. The radio resource shown in FIG. 2 is one subframe, which matches the system bandwidth.

Figure 2A:
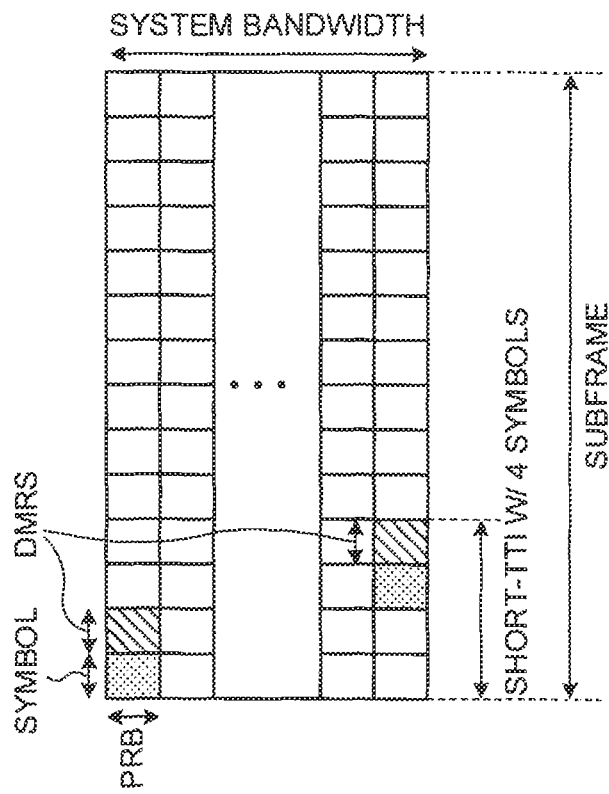
Figure 3A:
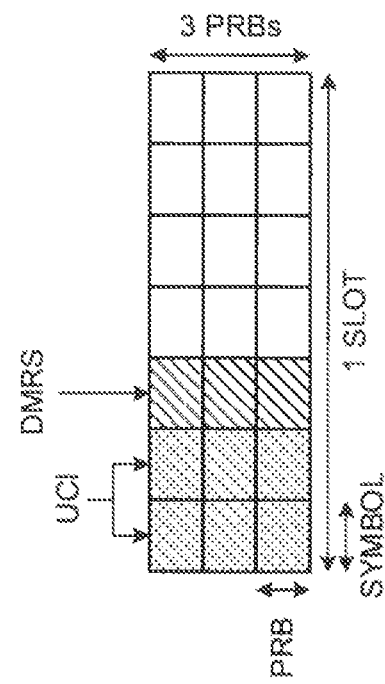
FIGS. 3A to 3D are diagrams, each showing an example of how a PF 4-based second sPF is structured.
Figure 3B:
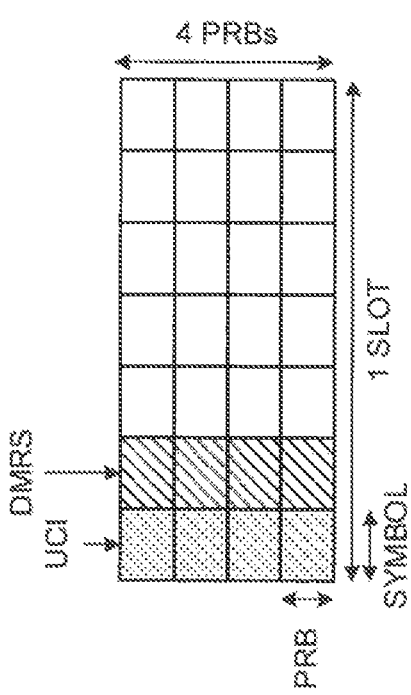
Figure 3C:
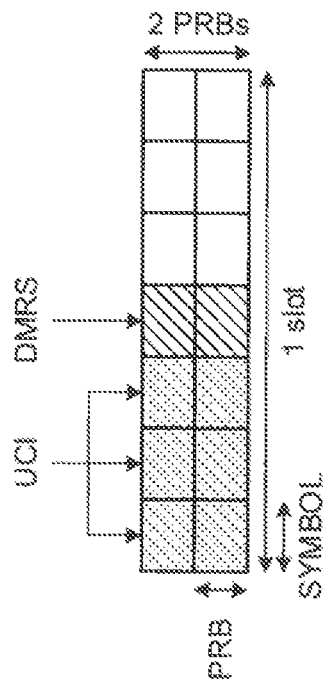
Figure 3D:
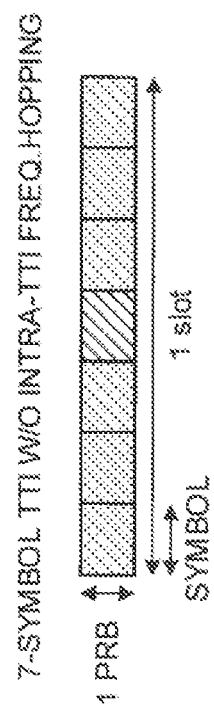

FIG. 2A shows an example of a mapping pattern for the first sPF, which is comprised of a TTI duration of four symbols, where intra-TTI frequency hopping is applied. In FIG. 2A, two symbol (one data symbol+one reference signal symbol) hop in frequency resources at both ends of the system bandwidth.

FIG. 2B shows an example of a mapping pattern for the first sPF, which is comprised of a TTI duration of seven symbols, where intra-TTI frequency hopping is applied, in FIG. 2B, in the first sPF, four symbols (two data symbols+two reference signal symbols) and three symbols (two data symbols+one reference signal symbol) hop in frequency resources at both ends of the system bandwidth.

In addition, when there are time resources adjacent to each other before and after hopping, either one may be used as reference signal symbols (FIG. 2A), both may be used as reference signal symbols (FIG. 2B), or both may be used as data symbols.

Second sPF

A second sPF, based either on PF 4 or PF 5, preferably supports (covers) TTI durations of three, four and seven symbols. Also, it is preferable that the PF 4-based second sPF supports a TTI duration of two symbols. Note that intra-TTI frequency hopping needs not be applied to the second sPF comprised of a TTI duration of two or three symbols. Meanwhile, intra-TTI frequency hopping may or may not be applied to the second sPF comprised of a TTI duration of four or seven symbols.

In the second sPF, both the DMRS and data are mapped to the same frequency for channel estimation (coherent detection). Also, the PF 4-based second sPF supports multiple PRBs, like PF 4 does. The PF 5-based second sPF supports one PRB, like PF 5 does.

The PF 4-based second sPF supports one UE only, like PF 4 does. The PF 5-based second sPF supports two UEs, like PF 5 does.

As for the coding method for the second sPF, tail biting convolutional coding (TBCC) is used. Also, transmit antenna diversity (for example, SORTD) may be configured for the second sPF. For example, information as to whether or not to apply transmit antenna diversity to sPUCCH transmission in accordance with the second sPF may be reported to the UE, and the UE may judge whether or not to apply transmit antenna diversity based on this information.

Note that existing PP 4 and PP 5 are basically assumed to be applied to UEs with good communication quality, and so do not support transmit antenna diversity. Meanwhile, since the TTI duration is short and the quality of communication tends to deteriorate in the second sPF, it is preferable to apply transmit antenna diversity.

FIG. 3 are diagrams, each showing an example of how a PF 4-based second sPF is structured. Note that, although FIG. 3 show examples in which the second sPF is mapped to consecutive symbols from the beginning of one slot, the time resources to which the second sPF is mapped are not limited to these.

FIGS. 3A to 3D show the resource locations of data symbols where UCI (A/N, SR, CSI, etc.) is mapped, and reference signal symbols where the DMRS is mapped. It is also possible to configure the second sPF so that, the shorter the TTI duration, the more frequency resources (PRBs) to use for mapping. In FIG. 3, symbols are mapped using four PRBs, three PRBs, two PRBs and one PRB, when the TTI duration is two symbols, three symbols, four symbols and seven symbols, respectively.

Information regarding the frequency resources (for example, the number of PRBs) for use in the second sPF may be reported (configured, indicated, etc.) to the UE using higher layer signaling (for example, RRC signaling, broadcast information (MIB (Master Information Block), SIBs (System Information Blocks), etc.), physical layer signaling (for example, downlink control information (DCI)), or a combination of these, and the UE may map the sPUCCH based on this information.

The information about the frequency resources (for example, the number of PRBs) for use in the second sPF may be a predetermined index. FIG. 4 is a diagram to show a table related to the number of PRBs used in existing PF 4. With respect to existing PF 4, a predetermined index (numberOfPRB-format4-r13) is configured in the UE by higher layer signaling, and the UE looks up the table shown in FIG. 4 and determines the number of PRBs ($M_{RB}^{PUCCH4}$) to use in PF 4. For the second sPF, the same or a similar table as in FIG. 4 may be defined or configured, and the UE may determine the number of PRBs based on the index that is reported.

Figure 5A:
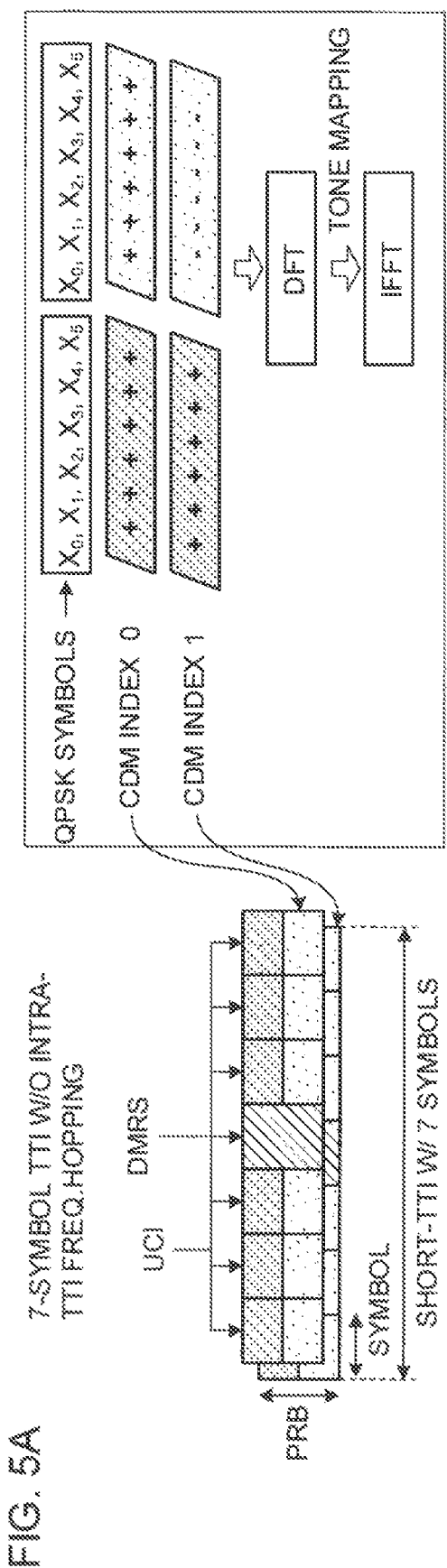
FIGS. 5A and 5B are diagrams, each showing an example of how a PF 5-based second sPF is structured.

FIG. 5 are diagrams, each showing an example of how a PF 5-based second sPF is structured. With the present example, a second sPF that is comprised of a TTI duration of seven symbols will be shown. FIG. 5A shows an example of a mapping pattern for a second sPF comprised of a TTI duration of seven symbols, to which intra-TTI frequency hopping is not applied. When PF 5 is the base, it is assumed that two UEs are multiplexed (the spreading factor is 2), so that, as shown in FIG. 5A, the UE sets the data symbols to be transmitted to $X_0$ to $X_5$, which match six subcarriers, generates duplicates, and generate one PRB (=twelve subcarriers) of data symbols (sequence set).

The UE multiplies the twelve symbols generated by spreading codes, thereby applying CDM. The spreading code corresponding to CDM index 0 consists entirely of the same positive value (for example, +1), and, as for the spreading code corresponding to CDM index 1, for example, the first-half six symbols are comprised of the same positive value (for example, +1), and the second-half six symbols are comprised of a negative value of the same absolute value (for example, −1). In this way it is possible to separate signals from multiple UEs that are transmitted in the same resource by using different spreading codes.

After CDM is applied, the UE performs discrete Fourier transform (DFT) preceding, so that the single-carrier peak-to-average power ratio (PAPR) characteristic can be maintained. The DMRS is separately orthogonalized. For example, a UE, to which CDM index 0 is assigned, may apply a cyclic shift of 0 to the DMRS and a UE, to which CDM index 1 is assigned, may apply a cyclic shift of 6 to the DMRS. Note that the values of cyclic shift are not limited to these.

Figure 5B:
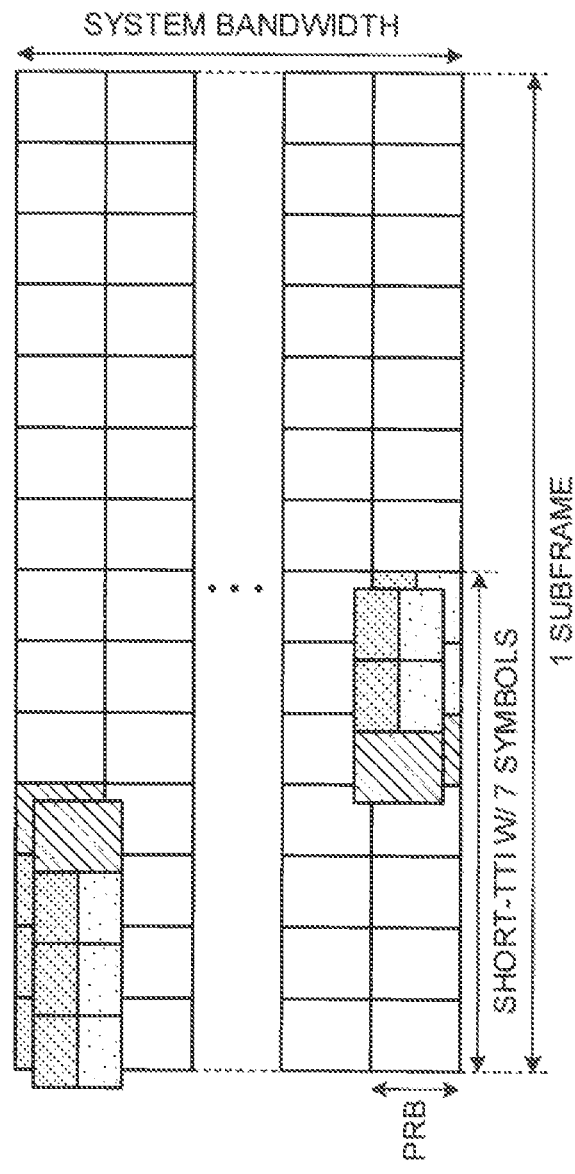

FIG. 5B shows an example of a mapping pattern for a second sPF which is comprised of a duration of seven symbols, where intra-TTI frequency hopping is applied. In FIG. 5B, in the second sPF, four symbols (two data symbols+two reference signal symbols) and three symbols (two data symbols+one reference signal symbol) hop in frequency resources at both ends of the system bandwidth.

Note that the UE may use either one of PF 4-based second sPF or a PF 5-based second sPF, or use both by switching between the two.

Operation of UE

The UE uses the first sPF and the second sPF selectively, depending on the payload size of UCI (that is, judges (determines) which one of the first sPF and the second sPF to use to transmit UCI).

Figure 6:
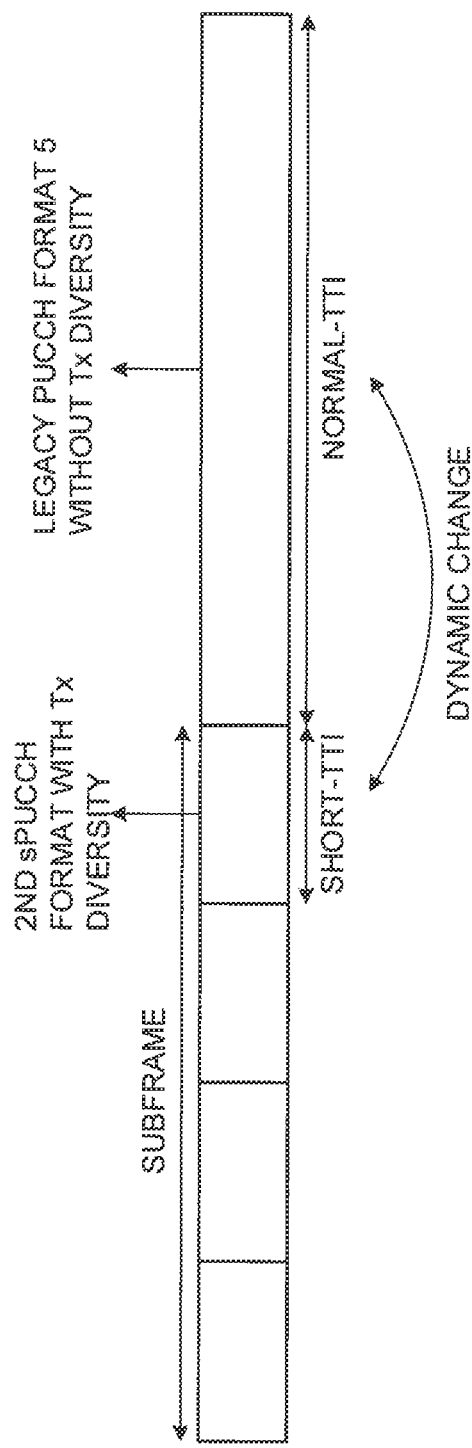
FIG. 6 is a diagram to show an example of PUCCH/sPUCCH transmission operation by a UE, according to a first embodiment of the present invention.

FIG. 6 is a diagram to show an example of PUCCH/sPUCCH transmission operation by the UE according to the first embodiment. FIG. 6 shows two subframes, where sTTIs are used in the first subframe, and where a normal TTI is used in the second subframe. In this example, the length of an sTTI is one quarter of the length of a subframe, but this is by no means limiting.

In the sTTIs, the UE transmits the sPUCCH in accordance with the first sPF or the second sPF. Also, in the normal TTI, the UE transmits the existing PUCCH following existing rules (specification). The UE may decide whether to apply transmit diversity to the PUCCH and/or the sPUCCH based on their respective configurations.

In FIG. 6, an sPUCCH in accordance with a second sPF, to which transmission diversity is applied, is transmitted in the last sTTI, while a PUCCH in accordance with existing PP 5, to which transmission diversity is not applied, is transmitted in the normal TTI, which is continuous in time with the last sTTI. Switching of the TTI duration is preferably controlled on a dynamic basis, in units of subframes as shown in FIG. 6, but the control time unit is not limited to this.

Also, for each sPF of the first embodiment, QPSK (Quadrature Phase Shift Keying) may be used as the modulation scheme. However, when transmitting one A/N bit as UCI, it is preferable to use BPSK (Binary Phase Shift Keying).

FIG. 7 is a diagram to show examples of sPF payload sizes that allow transmission in the first embodiment. With the first sPF based on PF 1/1a/1b, the UE can transmit one or two bits by using one PRB as an sPUCCH resource, regardless of the number of symbols in an sTTI.

With the second sPF based on PP 5, if the TTI duration is larger than two symbols, the UE can transmit a payload of a size proportional to the number of symbols (for example, twelve bits×the number of data symbols), using one PRB as are sPUCCH resource.

With the second sPF based on PF 4, the UE can transmit a payload of a size proportional to the number of PRBs and the number of symbols (for example, twenty-four bits×the number of data symbols×the number of PRBs), using one or more PRBs as sPUCCH resources.

According to the first embodiment described above, even when sTTIs are used, it is possible to provide a trade-off between the quality of communication and overhead, and/or others, suitably, for both UCI of large size and UCI of small size.

Second Embodiment

A second embodiment of the present invention provides an sPF, in which a variable spreading factor is applied to one or more PRBs (hereinafter also referred to as "third sPF"). For the third sPF, one sPUCCH format that is compatible with varying TTI durations is set forth and used. Also, the third sPF can support from a relatively small payload size to a relatively large payload size.

Third sPF

The third sPF preferably supports (covers) TTI durations of two, three, four and/or seven symbols. Note that at least two symbols are preferably arranged in the same frequency, and intra-TTI frequency hopping needs not be applied to the third sPF comprised of a TTI duration of two or three symbols. Meanwhile, intra-TTI frequency hopping may or may not be applied to the third sPF comprised of a III duration of four or seven symbols.

In the third sPF, both the demodulation reference signal (DMRS (DeModulation Reference Signal)) and data are mapped to the same frequency for channel estimation (coherent detection). The third sPF may be configured so that the location (position) of the DMRS changes depending on the TTI duration, or configured so that the DMRS is mapped to a predetermined symbol (for example, the first SC-FDMA symbol in a TTI) regardless of the TTI duration. By fixing the location of the DMRS (for example, in the first symbol in one slot), multiple sPUCCHs of different TTI durations can be multiplexed over the same PRB.

Also, the third sPF is comprised of one or more PRBs. Information about frequency resources (for example, the number of PRBs) for use in the third sPF may be reported (configured, indicated, etc.) to the UE through higher layer signaling (for example, RRC signaling), physical layer signaling (for example, DCI) or a combination of these, and the UE may map the sPUCCH based on this information.

Also, in the third sPF, the spreading factor used in a symbol (or applied to a symbol) is variable. Information about the spreading factor for use in the third sPF may be reported (configured, indicated, etc.) to the UE through higher layer signaling, physical layer signaling or a combination of these, and the UE may map the sPUCCH based on this information.

As for the coding method for the third sPF different methods can be used depending on the payload size of UCI. For example, block code may be used when the payload size of UCI is two bits or less, Reed-Muller code (RM code) may be used when the payload size of UCI is twenty-two hits or less, and TBCC may be used when the payload size of UCI is larger than twenty-two bits.

Also, transmit antenna diversity (for example, SORTD) may be configured for the third sPF. For example, information as to whether or not to apply transmit antenna diversity to sPUCCH transmission in accordance with the third sPF may be reported to the UE, and the UE may judge whether or not to apply transmit antenna diversity based on this information.

Figure 8A:
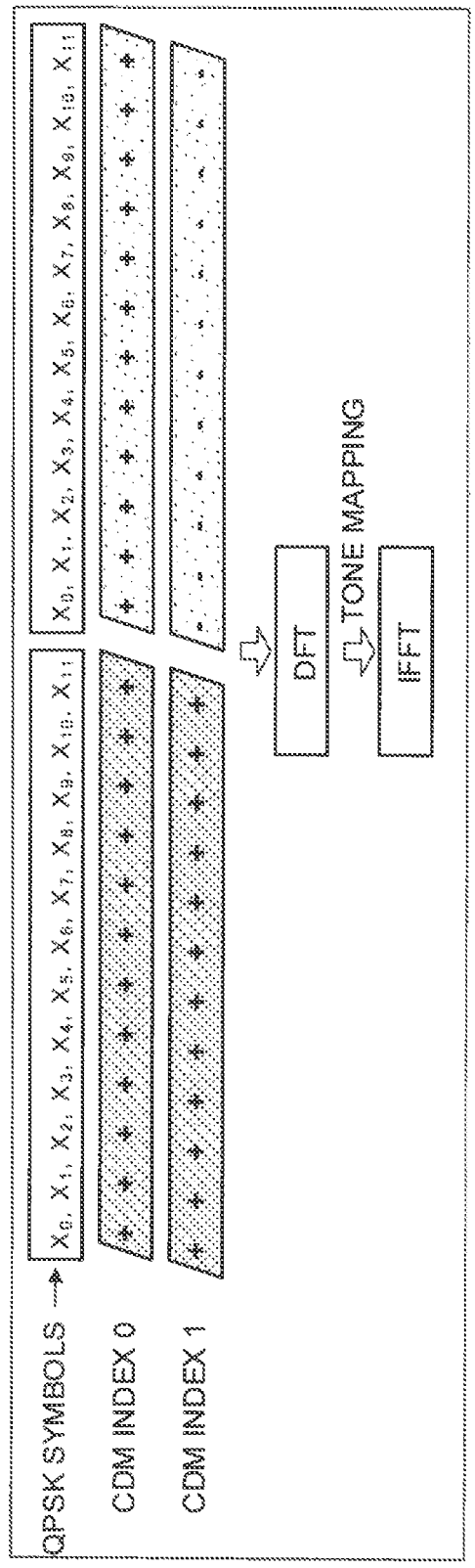
FIGS. 8A and 8B are diagrams, each showing an example of how a third sPF is structured when the location of the DMRS changes depending on the TTI duration.
Figure 8B:
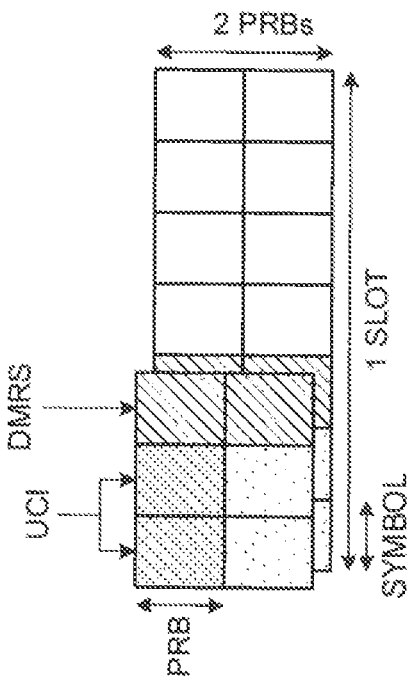

FIG. 8 provide diagrams to show an example of how the third sPF is structured in the event the location of the DMRS changes depending on the TTI duration. This example show an sPF structure in which the TTI duration is three symbols, the number of PRBs is two and the spreading factor is two.

In this case, the UE sets the data symbols to be transmitted to $X_0$ to $X_{11}$, which match twelve subcarriers, generates duplicates, and generates two PRBs (=twenty-four subcarriers) of data symbols (sequence set).

The UE multiplies the twenty-four symbols generated, by spreading codes, thereby applying CDM. The spreading code corresponding to CDM index 0 consists entirely of the same positive value (for example, +1), and, as for the spreading code corresponding to CDM index 1, for example, the first-half twelve symbols are comprised of the same positive value (for example, +1), and the second-half twelve symbols are comprised of a negative value of the same absolute value (for example, −1).

After CDM is applied, the UE performs discrete Fourier transform (DFT) precoding. The DMRS is orthogonalized separately. For example, a UE, to which CDM index 0 is assigned, may apply a cyclic shift of 0 to the DMRS, and a UE, to which CDM index 1 is assigned, may apply a cyclic shift of 6 to the DMRS. Note that the values of cyclic shifts are not limited to these.

Figure 9A:
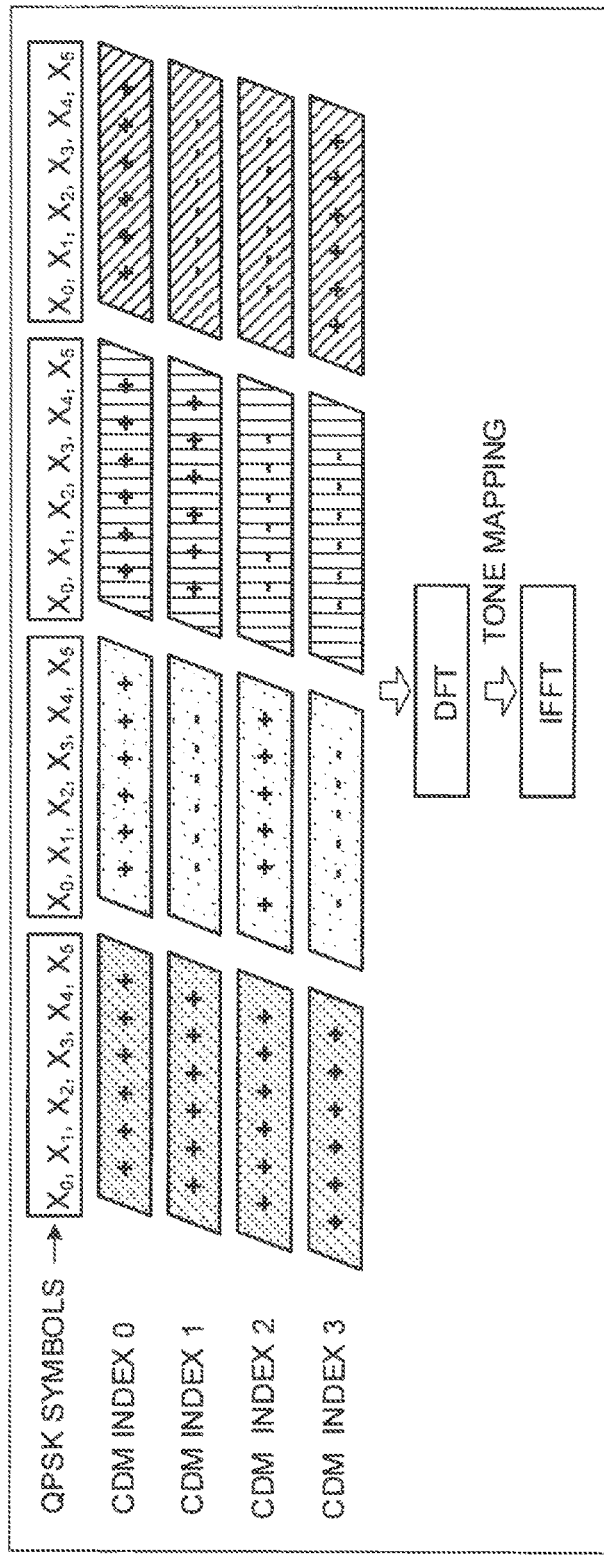
FIGS. 9A and 9B are diagrams, each showing another example of how the third sPF is structured when the location of the DMRS changes depending on the TTI duration.
Figure 9B:
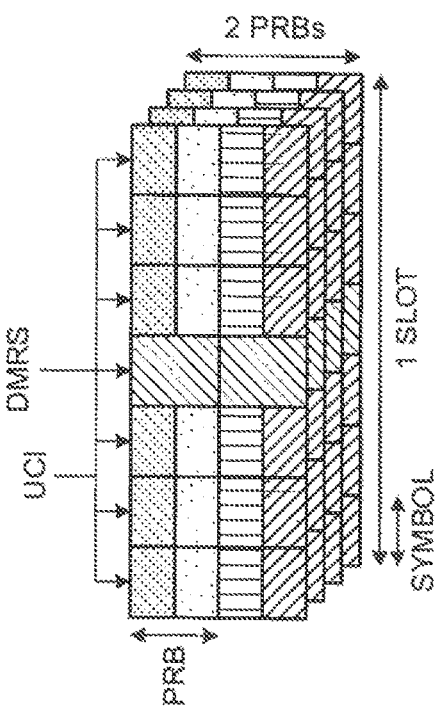

FIG. 9 provide diagrams to show another example of how the third sPF is structured in the event the location of the DMRS changes depending on the TTI duration. This example show an sPF structure in which the TTI duration is seven symbols (without intra-TTI frequency hopping), the number of PRBs is two and the spreading factor is four. In FIG. 8 above, the DMRS was located in the third symbol from the beginning in one slot, whereas, in FIG. 9, the DMRS is located in the fourth symbol from the beginning in one slot, and the location of the DMRS changes depending on the TTI duration.

In this example, the UE sets the data symbols to be transmitted to $X_0$ is $X_5$, which match six subcarriers, generates duplicates, and generates two PRBs (=twenty-four subcarriers) of data symbols (sequence set).

The UE multiplies the twenty-four symbols, generated, by spreading codes, thereby applying CDM. The spreading codes corresponding to CDM indices 0 to 3 are structured to be orthogonal to each other. After CDM is applied, the UE performs DFT precoding.

The DMRS is orthogonalized apart from the data symbols. For example, UEs, to which CDM indices 0, 1, 2 and 3 are assigned, may apply cyclic shifts of 0, 6, 3 and 9, to the DMRS, respectively. The values of cyclic shifts are not limited to these values.

Figure 10A:
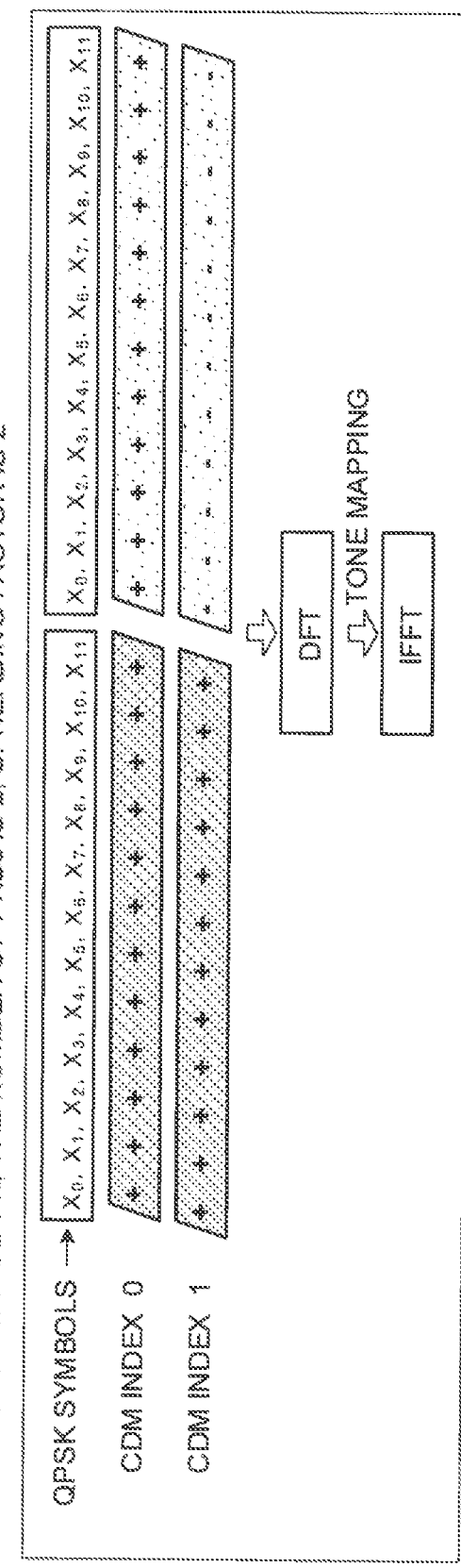
FIGS. 10A and 10B are diagrams, each showing an example of how the third sPF is structured, in the event the DMRS is mapped to the location of the first SC-FDMA symbol in the TTI regardless of the TTI duration.
Figure 10B:
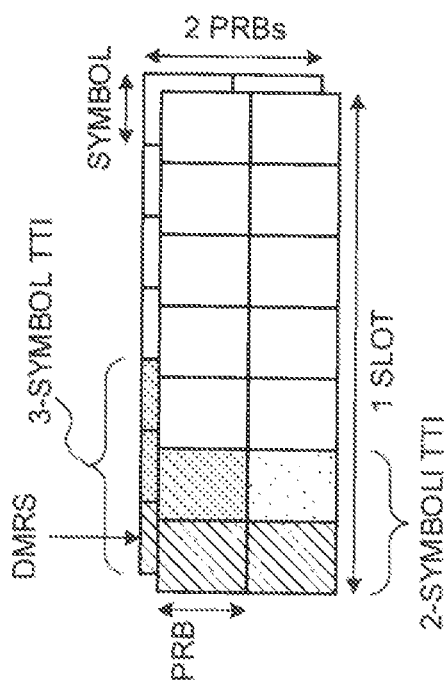

FIG. 10 are diagrams, each showing an example of how the third sPF is structured, in the event the DMRS is mapped to the location of the first SC-FDMA symbol in TTIs, regardless of the TTI duration. FIG. 10 show examples in which sPUCCHs in accordance with sPFs having different TTI durations are multiplexed over the same PRB. In this example, an sPF structure in which the TTI duration is two symbols, the number of PRBs is two and the spreading factor is two, and an sPF structure in which the TTI duration is three symbols the number of PRBs is two and the spreading factor is two are shown.

In this way, the DMRS is assigned to the same time resource location in one slot, so that one or more UEs can transmit sPUCCHs of different TTI durations in the same slot, and the base station can demultiplex and decode these sPUCCHs. The sPUCCH transmission process (DFT preceding and others) in the UE is the same as in FIG. 8 and FIG. 9, so the explanation will be omitted.

Operation of UE

Figure 11:
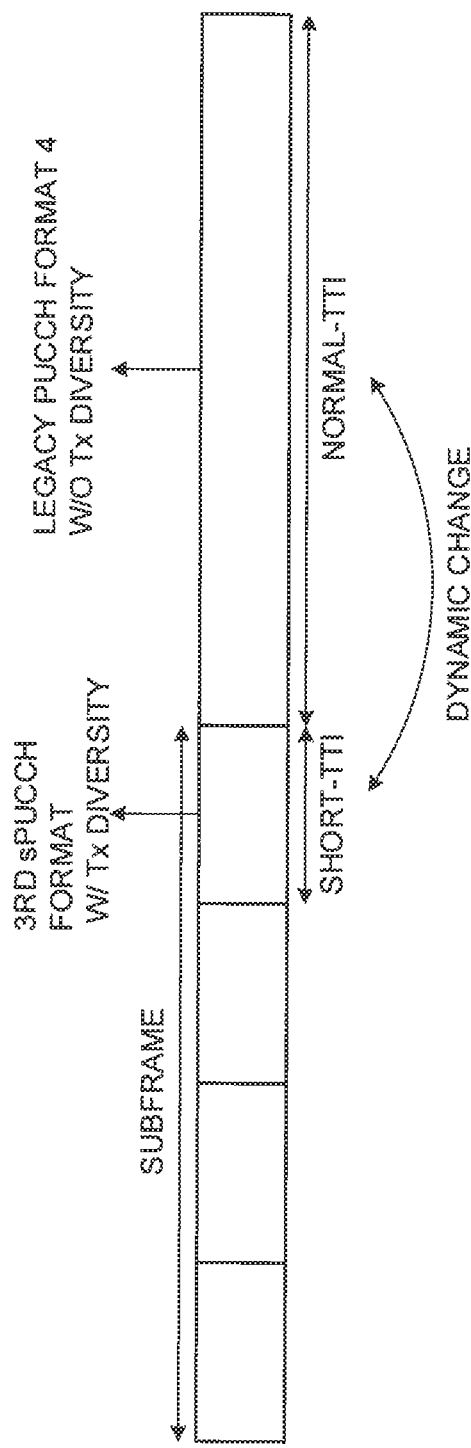
FIG. 11 is a diagram to show an example of PUCCH/ sPUCCH transmission operation by a UE according to a second embodiment of the present invention.

FIG. 11 is a diagram to show an example of PUCCH/sPUCCH transmission operation by the UE according to the second embodiment. FIG. 11 shows two subframes, where sTTIs are used in the first subframe, and a normal TTI is used in the second subframe. In this example, the length of an sTTI is one quarter of the length of a subframe, but this is by no means limiting.

In the sTTIs, the UE transmits the sPUCCH based on information (for example, information about at least one of the spreading factor, the number of PRBs and transmit diversity) that is reported/configured/indicated. In addition, in the normal TTI, the UE transmits the existing PUCCH in accordance with existing rules (specification). The UE determines whether or not to apply transmit diversity to the PUCCH and/or the sPUCCH based on their respective configurations.

In FIG. 11, an sPUCCH in accordance with the third sPF, to which transmit diversity is applied, is transmitted in the last sTTI, while a PUCCH in accordance with existing PF 4, to which transmit diversity is not applied, is transmitted in the normal TTI, which is continuous in time with the last sTTI. Switching of the TTI duration is preferably controlled on a dynamic basis, in units of subframes, but the control time unit is not limited to this.

Also, for the third sPF of the sec Id embodiment, QPSK may be used as the modulation scheme. However, when transmitting one A/N bit as UCI, it is preferable to use BPSK.

FIG. 12 is a diagram to show examples of sPF payload sizes that allow transmission in the second embodiment. FIG. 13 is a diagram to show other examples of sPF payload sizes that allow transmission in the second embodiment. FIGS. 12A, 12B, 13A and 13B correspond to third sPFs with spreading factors=12, 4, 3 and 2, respectively.

With the third sPF, the UE can transmit a payload of a size that is proportional to the number of PRBs and the number of symbols and that is inversely proportional to the spreading factor (for example, twenty-four bits the number of data symbols×the number of PRBs the spreading factor), using one or more PRBs as sPUCCH resources. When the spreading factor is 12 and one PRB is used as the sPUCCH resource, the UE may transmit one or two bits.

According to the second embodiment described above, even when sTTIs are used, it is possible to provide a trade-off between the quality of communication and overhead, and/or others, suitably, for both UCI of large size and UCI of small size.

Note that, although examples have been shown above with the first and second embodiments where the number of symbols which an sPF supports is 2, 3, 4, and 7, the number of symbols which an sPF supports is by no means limited to this set. For example, at least one of the first to third sPFs may be configured so that the number of symbols supported is greater than seven and less than fourteen.

Third Embodiment

A third embodiment of the present invention relates to a method by which the UE determines which one of the sPUCCH and the existing PUCCH to use when an A/N is included in UCI.

Figures 14A, 14B:
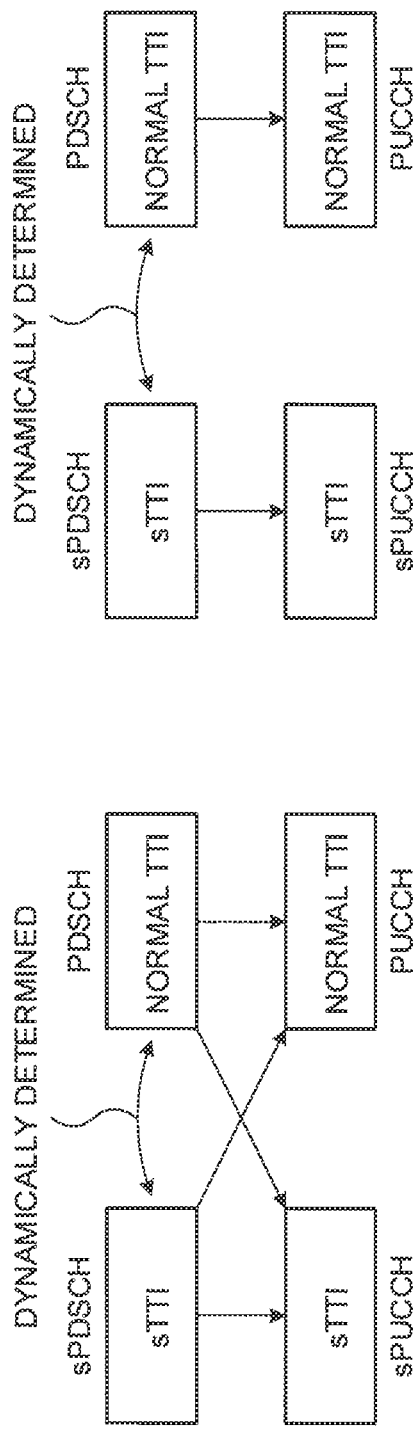
FIGS. 14A and 14B are diagrams, each showing an example of the method of determining whether sPUCCH is available for use, according to the third embodiment of the present invention.

FIG. 14 are diagrams to show examples of the method of judging whether or not an sPUCCH is available for use, according to the third embodiment. Regardless of whether DL data that relates to an A/N is transmitted in a normal TTI or in an sTTI, the UE may determine the TTI duration to use to transmit the A/N (that is, in compliance with an existing PF or in compliance with an sPF) based on predetermined information (FIG. 14A). Here, a data channel that is transmitted in an sTTI may be referred to as "sPDSCH (shortened PDSCH)."

In the example of FIG. 14A, information about the uplink control channel format to use to transmit UCI (A/N) may be reported (configured, indicated, etc.) explicitly to the UE by higher layer signaling, physical layer signaling or a combination of these, and, based on this information, the UE may determine the TTI duration to use to transmit UCI and map the UCI. This information may be information to indicate which of an sPUCCH and the existing PUCCH to use, may be information to indicate the TTI duration to use to transmit UCI, or may be information about the radio resources (for example, time resources) to use to transmit UCI.

Referring to FIG. 14A, no matter which one of an sPDSCH and the existing PDSCH (existing one subframe-long PDSCH) the UE receives, the UE can dynamically determine whether to use the sPUCCH or the existing PUCCH to transmit the corresponding UCI (A/N) based on signaling. This enables flexible scheduling.

Meanwhile, based on the TTI duration of a DL data that relates to an A/N, the UE may implicitly determine the TTI duration to use to transmit the A/N (that is, whether to follow an existing PF or follow an sPF) (FIG. 14B).

In the example of FIG. 14B, when the UE receives an sPDSCH, the UE can dynamically decide to transmit the corresponding UCI (A/N) in the sPUCCH. Also, when the LTE receives the existing PDSCH, the UE can dynamically decide to transmit the corresponding UCI (A/N) in the existing PUCCH. As a result of this, it is possible to implement communication using shortened TTIs while reducing the increase in overhead.

Note that, when an A/N and a UL-SCH occur in the same carrier and the same sTTI, the transmission resource of the A/N may be determined based on one of following rules (1) and (2):

(1) If simultaneous PUCCH-PUSCH transmission is not configured in the UE, the A/N may be communicated in the UL-SCH (piggyback). Here, when UL data is transmitted in the sPUSCH, the A/N is communicated within the sPUSCH. Otherwise (when UL data is transmitted in the existing PUSCH (one subframe-long PUSCH)), the A/N is communicated in the existing PUSCH, doing so, the A/N can be multiplexed and transmitted appropriately, depending on in which one of the sPUSCH and the PUSCH the A/N is transmitted.

(2) When simultaneous PUCCH-PUSCH transmission is configured in the UE, the A/N may be transmitted in the sPUCCH or in the existing PUCCH. In this case, the A/N is not transmitted in the PUSCH. Whether the A/N is transmitted in accordance with the sPF or in accordance with the existing PF is determined implicitly based on the TTI duration of the UL-SCH that is transmitted simultaneously with the A/N. Here, when UL data is transmitted in the sPUSCH, the A/N is communicated in the sPUCCH. Also, when UL data is transmitted in the existing PUSCH, the A/N is communicated in the existing PUCCH. By doing so, it is possible to prevent the situation where a plurality of channels of varying TTI durations are transmitted simultaneously, such as when an sPUSCH and a PUSCH are transmitted simultaneously, when an sPUSCH and a PUCCH are transmitted simultaneously and so on, so that A/Ns can be transmitted properly.

According to the third embodiment described above, it is possible to determine an appropriate channel for transmitting UCI based on predetermined information or based on the TTI duration of a data channel that is received.

Fourth Embodiment

A fourth embodiment of the present invention relates to specific information included in UCI that is transmitted in an sPUCCH and sPUCCH transmission resources.

UCI Transmitted Using the First sPF

UCI that is transmitted using the first sPF that has been described with the first embodiment includes a scheduling request (one bit) and/or HARQ-ACKs (one or two bits).

In this UCI, in the event CA is not applied, HARQ-ACKs may be configured so that one bit is included per transport block (TB) of a predetermined CC.

In this UCI, in the event CA is applied, HARQ-ACKs may be configured so that all CCs are bundled per TB (logical disjunction), and HARQ-ACKs (one bit each) are included on a per TB basis. Here, if at least one of transmission modes (TMs) 3/4/8/9/10 is configured in more than one CC, an HARQ-ACK is two bits, as a consequence. Meanwhile, when TMs 1/2/5/6/7 are configured in all CCs, an HARQ-ACK is one bit, as a consequence.

In this UCI, in the event CA is applied, HARQ-ACKs may be configured so that all TBs are bundled per CC (logical disjunction), and HARQ-ACKs (one bit each) are included on a per CC basis. In this case, with the first sPF, HARQ-ACKs for up to two CCs can be communicated.

When this UCI contains both an SR and HARQ-ACKs, if the SR is positive (=1), the UCI is transmitted using sPUCCH resources configured for an SR, and, if the SR is negative (=0), the UCI is transmitted using sPUCCH resources configured for HARQ-ACKs.

UCI Transmitted Using the Second sPF

UCI that is transmitted using the second sPF that has been shown with the first embodiment includes at least one of a scheduling request, HARQ-ACKs pertaining to one or more CCs, and P-CSIs pertaining to one or more CCs.

When this UCI includes an SR and HARQ-ACKs, the UCI is transmitted using sPUCCH resources configured for HARQ-ACKs.

When this UCI includes an SR and P-CSIs, the UCI is transmitted using sPUCCH resources configured for P-CSIs.

When this UCI includes HARQ-ACKs and P-CSIs, the UCI is transmitted using sPUCCH resources configured for HARQ-ACKs.

When this UCI includes an SR, HARQ-ACKs and P-CSIs, the UCI is transmitted using sPUCCH resources configured for HARQ-ACKs.

With the second sPF, if the payload size of UCI that is planned to be transmitted exceeds a predetermined threshold with respect to the coding rate, the UE may execute control so that one or more P-CSIs are dropped, so as to make the coding rate of the remaining UCI equal to or less than (or less than) the above predetermined threshold. Note that information about the predetermined threshold may be reported (configured) to the LTE by higher layer signaling, physical layer signaling or a combination of these.

Note that UCI that includes only a positive SR alone mar be transmitted either in accordance with the first sPF or the existing PF.

UCI Transmitted Using the Third sPF

UCI that is transmitted using the third sPF that has been shown with the second embodiment may include the above-described information with respect to UCI that is transmitted using the first sPF and/or UCI that is transmitted using the second sPF, and transmission resources may be determined based on the above-described rules. When UCI is transmitted in accordance with the third sPF, for example, depending on the size of UCI payload, at least one of the sPUCCH resources described with the first sPF and the sPUCCH resources described with the second sPF may be used.

Note that, no matter what UCI is used, information about sPUCCH resources may be reported (configured, indicated, etc.) to the UE by higher layer signaling, physical layer signaling or a combination of these, and the UE may select sPUCCH resources based on this information. For example, information about associations between sPUCCH resources and predetermined indices may be configured in the UE by way of higher layer signaling (for example, RRC signaling), and the UE may determine the sPUCCH resources based on the index specified by physical layer signaling and the above associations.

According to the fourth embodiment described above, the UE can transmit various UCI using appropriate sPUCCH resources.

Radio Communication System

Now, the structure of the radio communication system according to one embodiment of the present invention will be described below. In this radio communication system, communication is performed using one of the radio communication methods according to the herein-contained embodiments of the present invention, or a combination of these.

Figure 15:
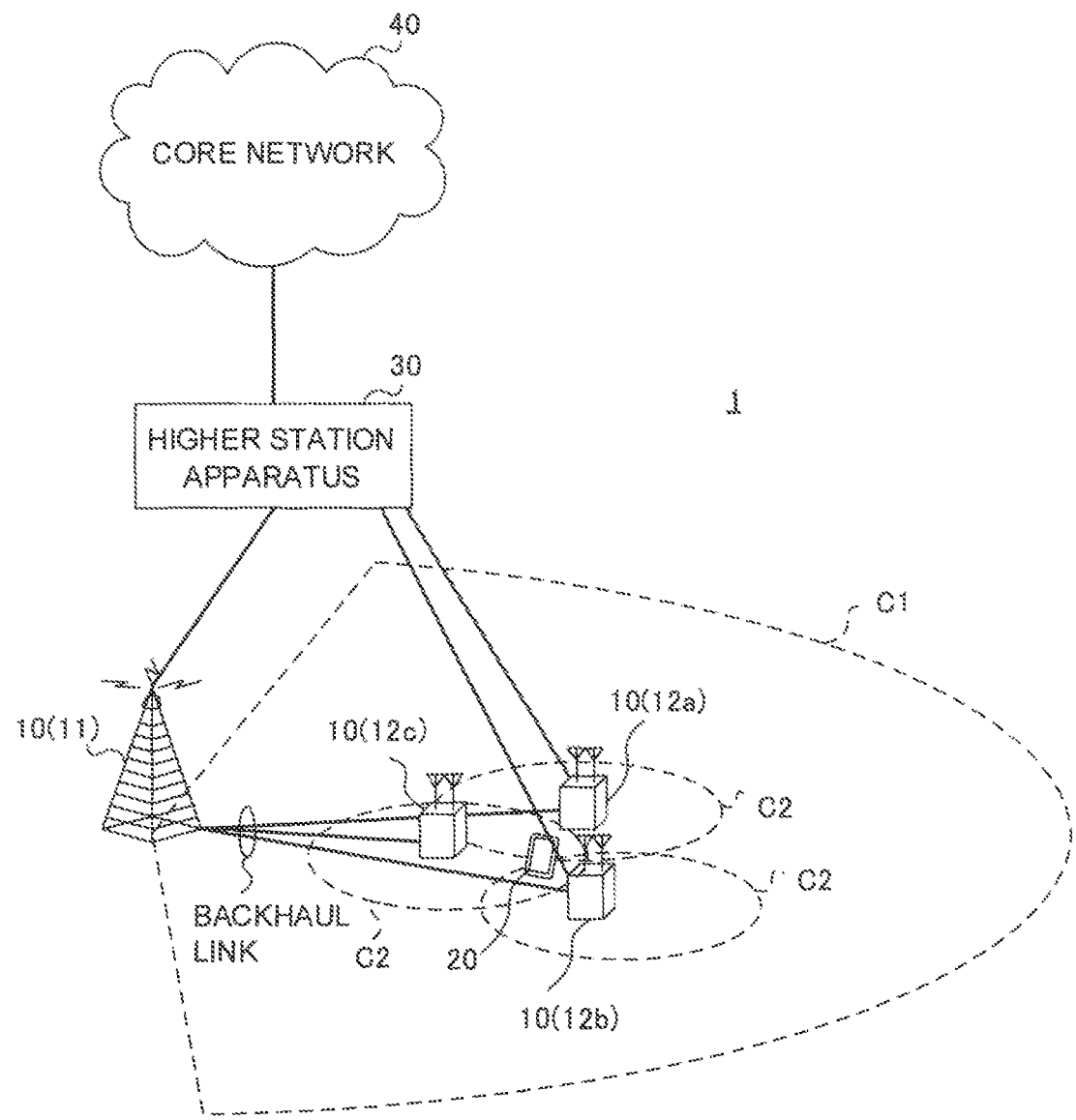
FIG. 15 is a diagram to show an example of a schematic structure of a radio communication system according to one embodiment of the present invention.

FIG. 15 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE Advanced)," "LTE-B (LTE-Beyond))," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pica base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast Channel)), downlink L1/L2 control channels and so on are used as downlink channels. User data, higher layer control information and SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control Channel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

Radio Base Station

Figure 16:
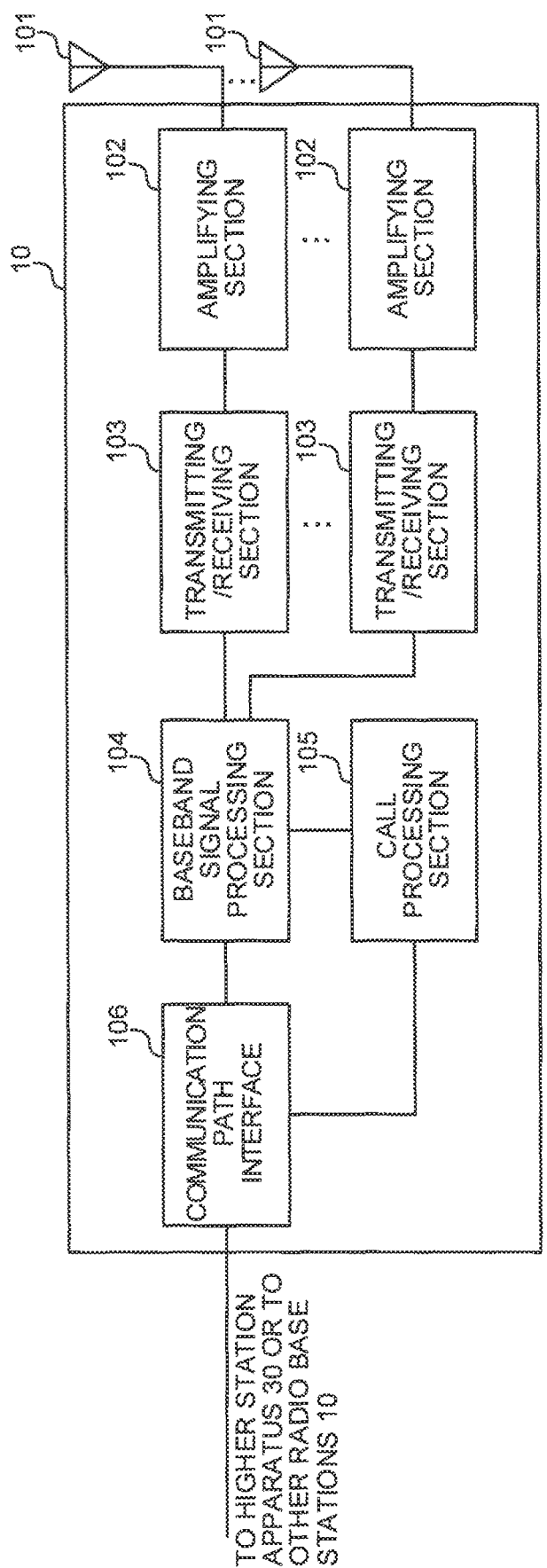
FIG. 16 is a diagram to show an example of an overall structure of a radio base station according to one embodiment of the present invention.

FIG. 16 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 And a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit the PDSCH, the sPDSCH and so on, to the user terminal 20. The transmitting/receiving sections 103 receive the PUCCH, the sPUCCH and so on, from the user terminal 20.

Furthermore, the transmitting/receiving sections 103 may transmit, to the user terminal 20, information about the frequency resources for use in at least one of the first, second and third sPFs, information about the spreading factor to use in the third sPF, information as to whether or not to apply transmit antenna diversity to a predetermined sPF, and so on.

Figure 17:
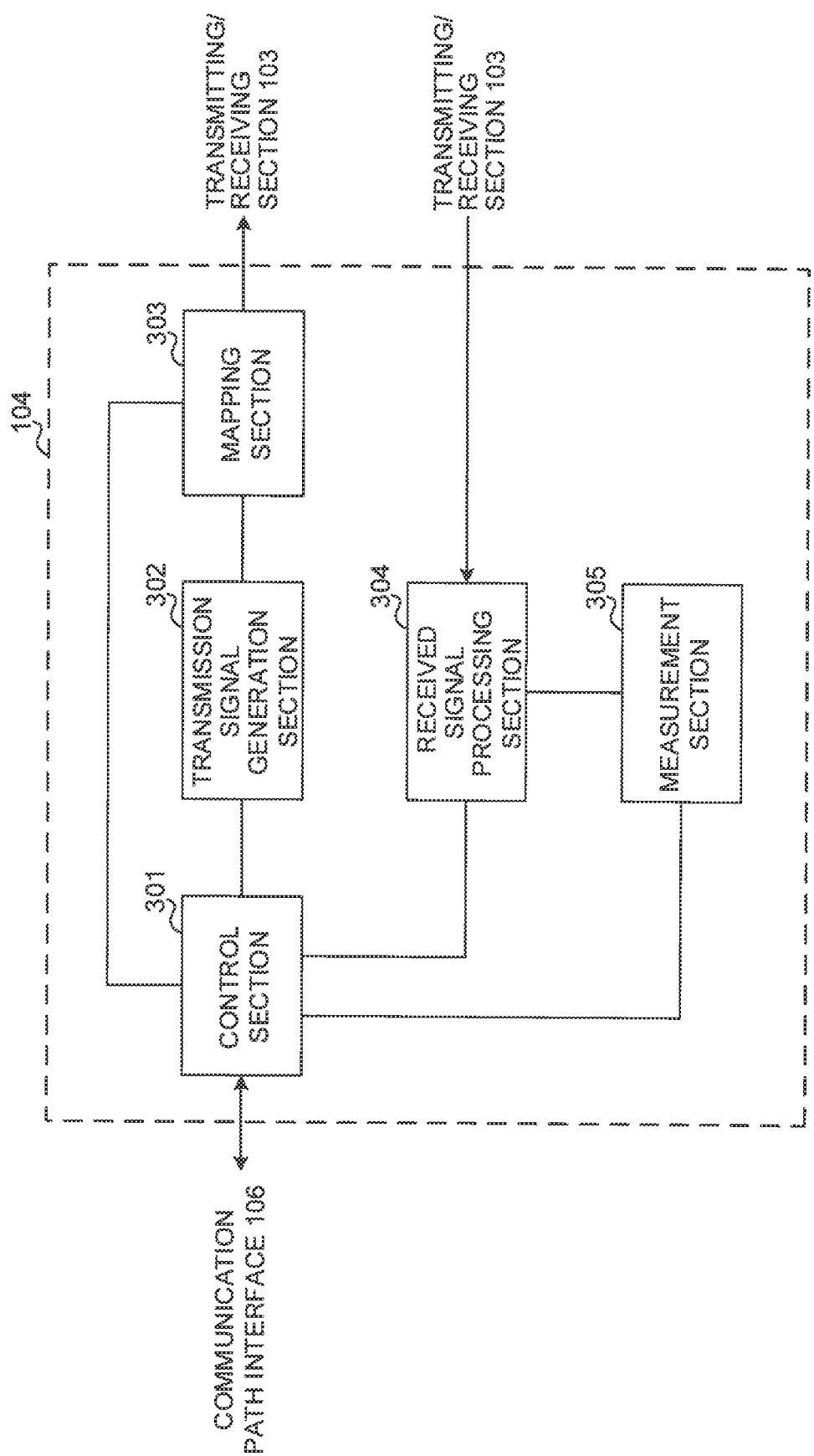
FIG. 17 is a diagram to show an example of a functional structure of a radio base station according to one embodiment of the present invention.

FIG. 17 is a diagram to show an example of a functional structure of a radio base station according to the present embodiment. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. The control section 301 controls the generation of downlink control signals (for example, delivery acknowledgement information and so on) and downlink data signals, based on the results of deciding whether or not retransmission control is necessary for uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

When UCI received from the user terminal 20 is acquired via the received signal processing section 304, the control section 301 performs data retransmission control and scheduling control on the user terminal 20 based on the UCI. For example, when HARQ-ACK is acquired from the received signal processing section 304, the control section 301 determines whether retransmission to the user terminal 20 is necessary or not, and exerts control so that retransmission processing is performed when retransmission is necessary.

The control section 301 exerts control so that communication is performed using sTTIs having a TTI duration shorter than 1 ms (existing subframes). For example, the control section 301 exerts controls so that UCI (sPUCCH) is received in a predetermined sTTI, assuming an uplink control channel format for use for shortened TTIs, compatible with multiple TTI durations (for example, at least one of the first sPF, the second sPF and the third sPF).

The control section 301 may report (configure) information about the sPF to use to transmit UCI, to the user terminal 20, and control this user terminal 20 to transmit UCI using an sPUCCH in accordance with the sPF, in a predetermined sTTI.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

User Terminal

Figure 18:
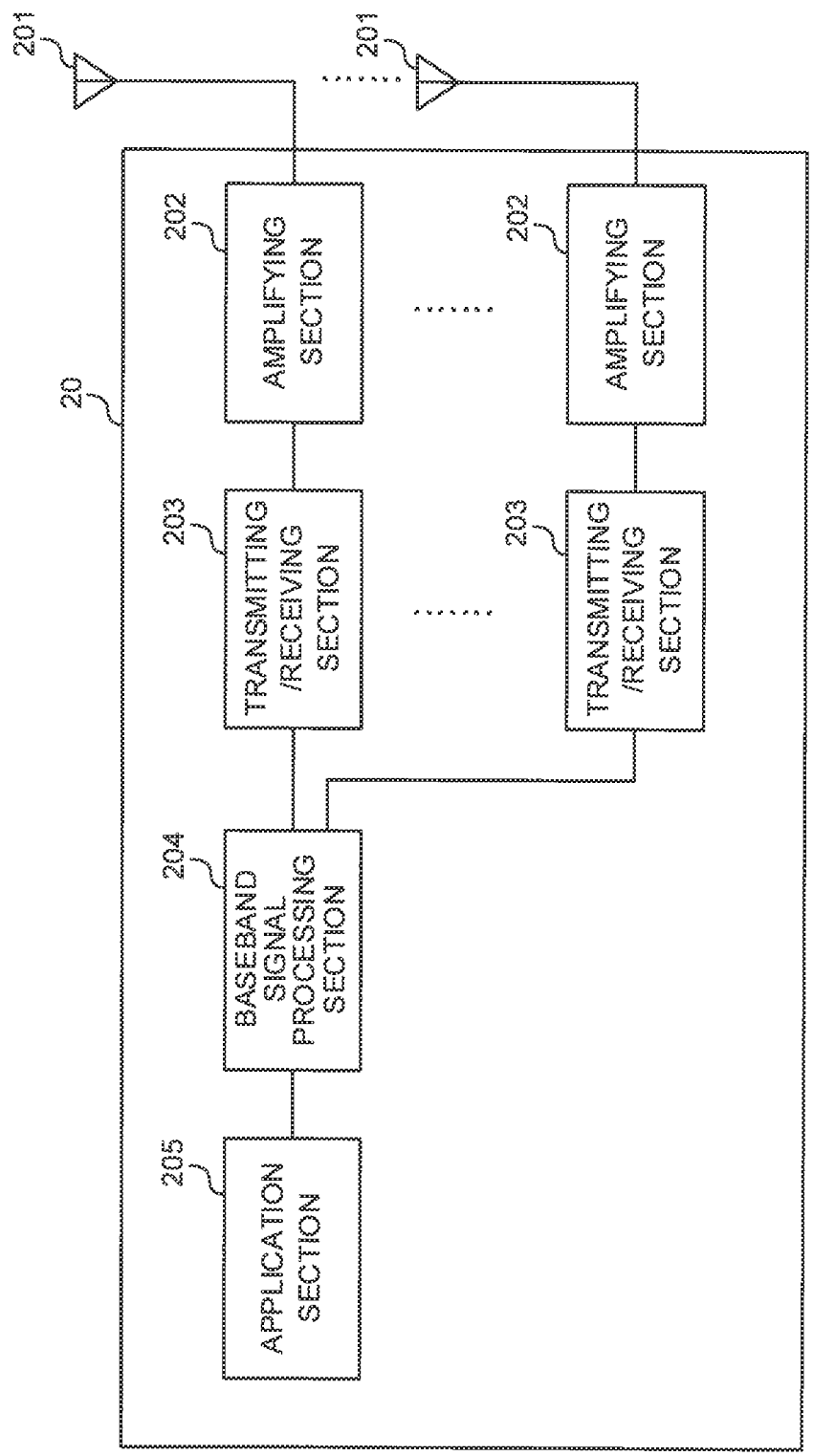
FIG. 18 is a diagram to show an example of an overall structure of a user terminal according to one embodiment of the present invention.

FIG. 18 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, preceding, discrete Fourier transform (DFT) process, an IFFT process and so on, and the result is forwarded to the transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 receive the PDSCH, the sPDSCH and so on, from radio base station 10. The transmitting/receiving sections 203 transmit the PUCCH, the sPUCCH and so on, to the radio base station 10.

Furthermore, the transmitting/receiving sections 203 may receive, from the radio base station 10, information about the frequency resources for use in at least one of the first, second and third sPFs, information about the spreading factor to use in the third sPF, information as to whether or not to apply transmit antenna diversity to a predetermined sPF, and so on.

Figure 19:
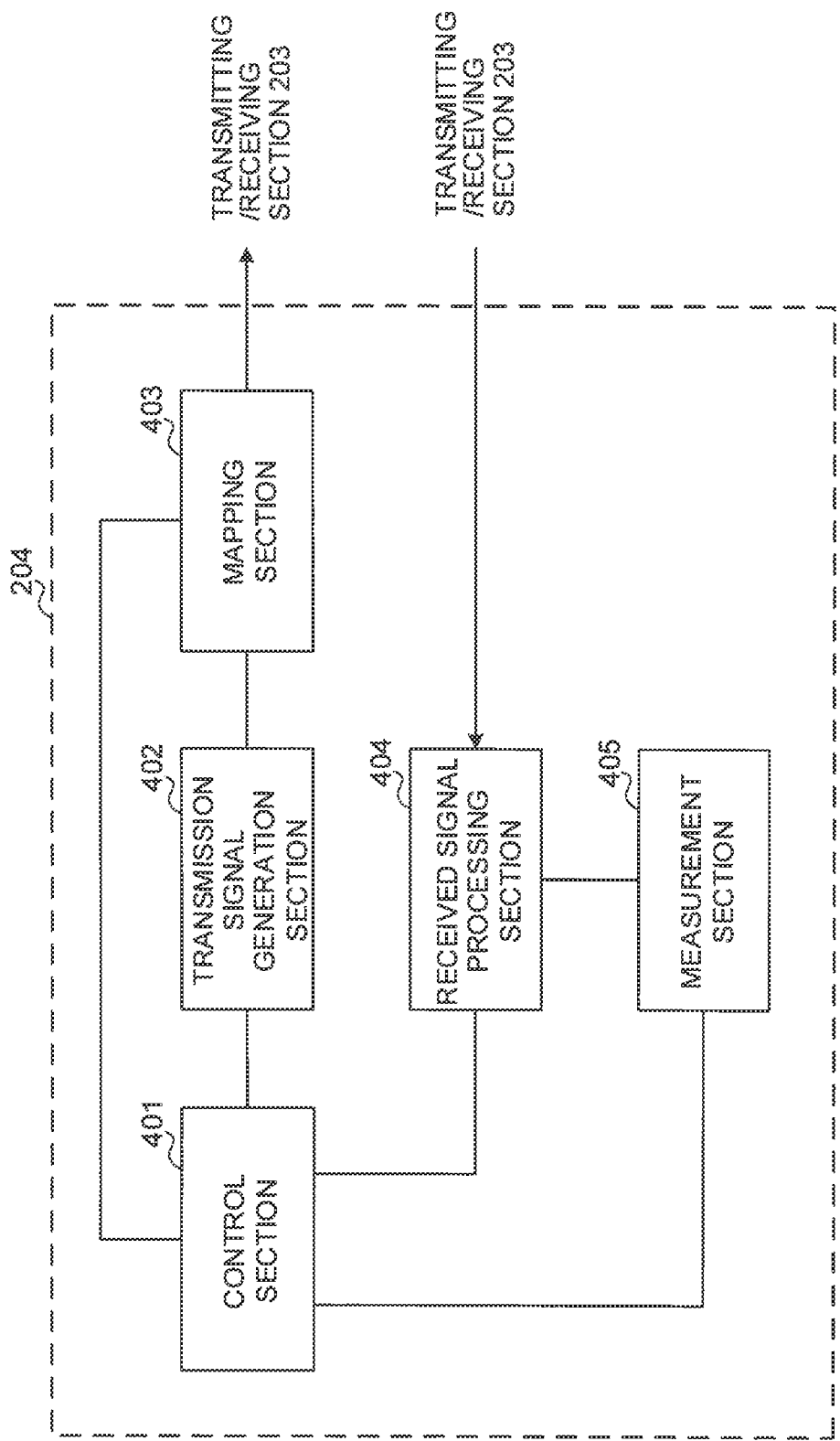
FIG. 19 is a diagram to show an example of a functional structure of a user terminal according to one embodiment of the present invention.

FIG. 19 is a diagram to show an example of a functional structure of a user terminal according to the present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 exerts control so that communication is performed using sTTIs having a TTI duration shorter than 1 ms (existing subframes). For example, the control section 401 exerts controls so that UCI (sPUCCH) is transmitted in a predetermined sTTI, using an uplink control channel format for use for shortened TTIs, compatible with multiple TTI durations (for example, at least one of the first sPF, the second sPF and the third sPF).

The control section 401 may exert control so that UCI is transmitted, using either a format for a relatively small payload size (first sPF) and a format for a relatively large payload size (second sPF) as the sPF, depending on the size of UCI (for example, the payload size).

The control section 401 may exert control so that UCI is transmitted using a single format (third sPF), in which both the spreading factor and the number of physical resource blocks in a symbol are variable, as the sPF.

When the sPUCCH is transmitted in accordance with the second sPF, the control section 401 may exert control so that the DMRS is mapped to the same radio resource (for example, the first symbol in one slot) either when the above predetermined sTTI has a first TTI duration (for example, two symbols) or when the above predetermined sTTI has a second TTI duration (for example, three symbols), which is different from the first TTI duration.

Furthermore, the control section 401 may exert control so that transmit diversity is applied to the above predetermined sTTI and UCI is transmitted, based on information reported from the radio base station 10.

In addition, the control section 401 may decide, based on information reported from the radio base station 10, whether to transmit UCI by using an sPUCCH in an sTTI, or to transmit UCI using a PUCCH in a normal TTI. Also, the control section 401 may decide, based on the TTI duration used to receive a predetermined DL signal (for example, DL data), whether to transmit UCI (for example, an A/N to transmit in response to the DL data using an sPUCCH in an sTTI or to transmit UCI using a PUCCH in a normal TTI.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beamforming RS transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 20:
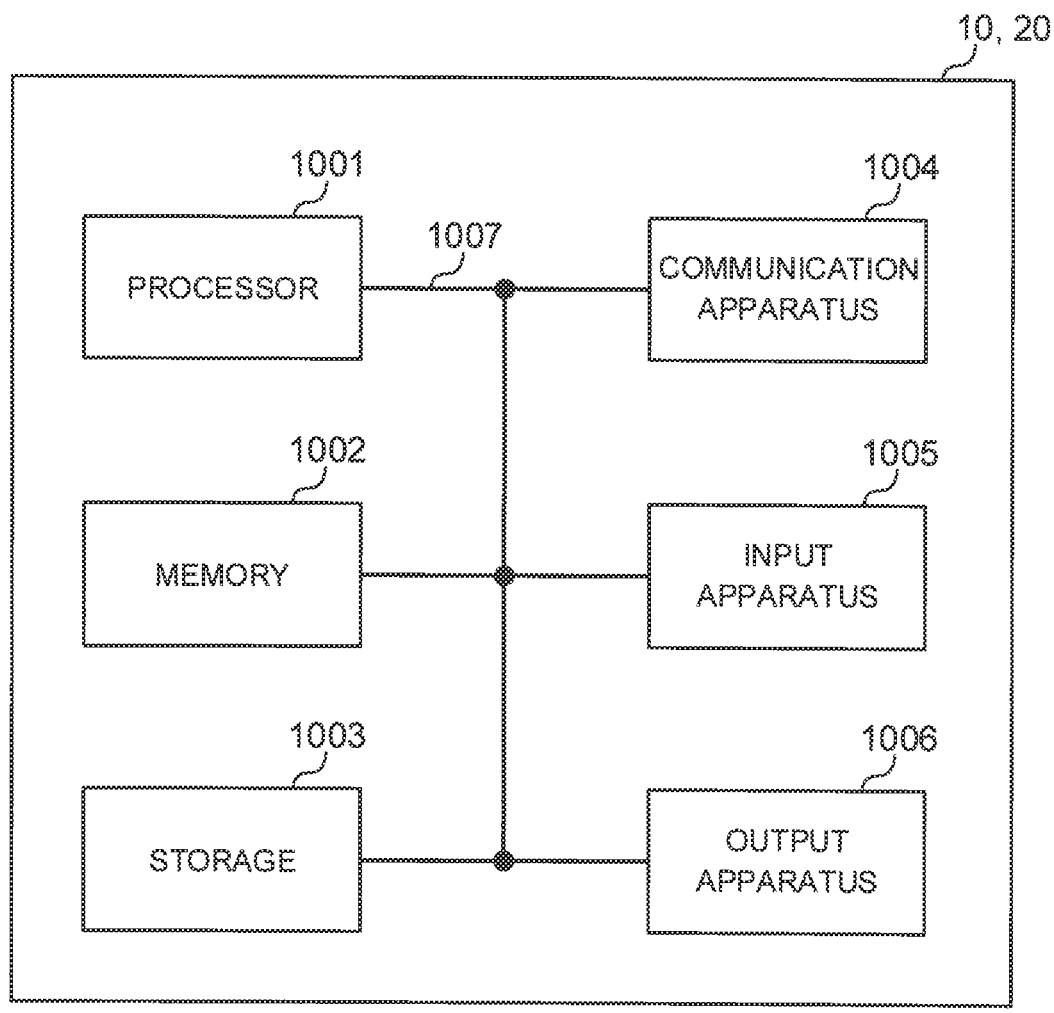
FIG. 20 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 20 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 And a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or mere processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," "a "cache," a main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 And the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period of time than one ms.

Here, a refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one length. One and one subframe each may be comprised of one or more resource blocks. Note that an RB may be referred to as a "physical resource block (PRB (Physical RB))," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples.

For example, configurations such as the number of subframes included in a radio frame, the number of slots included in a subframe, the number of symbols and REs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1) may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes for example, MMES (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied LTE (Long Term Evolution), LTE-A (LTE-Advanced), LTE-B (LTE-Beyond), SUPER 3G, MT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-096439, filed on May 12, 2016, including the specification, drawings and abstract, is incorporated herein by reference in its entirety.

The invention claimed is:

1. A terminal comprising:
   a transmitter that transmits uplink control information in an uplink control channel; and
   a processor that maps a signal and a demodulation reference signal to resource blocks of the uplink control channel,
   wherein the signal is obtained by multiplying symbols based on the uplink control information by an orthogonal code, and
   wherein the processor uses a sequence based on a cyclic shift associated with the orthogonal code for the demodulation reference signal.

2. The terminal according to claim 1, wherein the processor performs discrete Fourier transform precoding on a result of the multiplying and maps a result of the discrete Fourier transform precoding into the resource blocks of the uplink control channel.

3. The terminal according to claim 1, wherein a spreading factor of the orthogonal code is based on at least one of higher layer signaling and physical layer signaling.

4. The terminal according to claim 3, wherein the cyclic shift is based on an index of the orthogonal code.

5. The terminal according to claim 4, wherein the index of the orthogonal code comprises 0, 1, 2 and 3, which are associated with values of the cyclic shift 0, 6, 3 and 9, respectively.

6. The terminal according to claim 1, wherein a number of symbols of the uplink control channel is based on at least one of higher layer signaling and physical layer signaling.

7. The terminal according to claim 2, wherein a spreading factor of the orthogonal code is based on at least one of higher layer signaling and physical layer signaling.

8. The terminal according to claim 2, wherein a number of symbols of the uplink control channel is based on at least one of higher layer signaling and physical layer signaling.

9. A radio communication method for a terminal, comprising:
   transmitting uplink control information in an uplink control channel; and
   mapping a signal and a demodulation reference signal to resource blocks of the uplink control channel,
   wherein the signal is obtained by multiplying symbols based on the uplink control information by an orthogonal code, and
   wherein the terminal uses a sequence based on a cyclic shift associated with the orthogonal code for the demodulation reference signal.

* * * * *